(12) United States Patent
Crowther et al.

(10) Patent No.: US 6,201,230 B1
(45) Date of Patent: Mar. 13, 2001

(54) SENSOR SYSTEM WITH DYNAMIC OPTICAL CORRECTOR

(75) Inventors: Blake G. Crowther, Logan, UT (US); Dean B. McKenney, Tucson, AZ (US); Scott W. Sparrold, Tucson, AZ (US); James P. Mills, Tucson, AZ (US); Douglas M. Beard, Tucson, AZ (US); Daniel C. Harrison, Tucson, AZ (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/164,438

(22) Filed: Sep. 30, 1998

Related U.S. Application Data

(60) Provisional application No. 60/060,872, filed on Oct. 2, 1997.

(51) Int. Cl.[7] .................................................. G01C 21/02
(52) U.S. Cl. ........................ 250/203.6; 250/216; 244/3.16
(58) Field of Search ................................. 250/203.6, 216, 250/203.1; 356/121; 359/727, 708, 725, 718; 244/3.1, 3.16, 3.17, 3.18

(56) References Cited

U.S. PATENT DOCUMENTS

| 4,039,246 | 8/1977 | Voigt . | |
|---|---|---|---|
| 4,070,573 | 1/1978 | Allen et al. | 250/216 |
| 4,384,759 | 5/1983 | Ferrante . | |
| 4,773,748 | 9/1988 | Shih et al. . | |
| 4,850,275 | 7/1989 | Utreja et al. | 244/3.16 |
| 5,220,159 | * 6/1993 | Friedenthal | 250/201.9 |
| 5,596,185 | 1/1997 | Bross et al. | 250/208.1 |
| 5,946,143 | * 8/1999 | Whalen | 359/728 |

* cited by examiner

*Primary Examiner*—Que T. Le
(74) *Attorney, Agent, or Firm*—David W. Collins; Glenn H. Lenzen, Jr.

(57) ABSTRACT

A programmable optical system that dynamically corrects or induces aberrations into the optical path of a missile seeker. The system is dynamic in that the amount and type of aberration may be changed while the missile is in flight. The dynamic correction is accomplished by means of deformations applied to a low-mass mirror or mirrors in the optical path of the missile seeker. The missile includes an aspheric dome, and the optical system is dynamically compensated for aberrations introduced by the dome as the seeker system is moved through the field of regard.

14 Claims, 3 Drawing Sheets

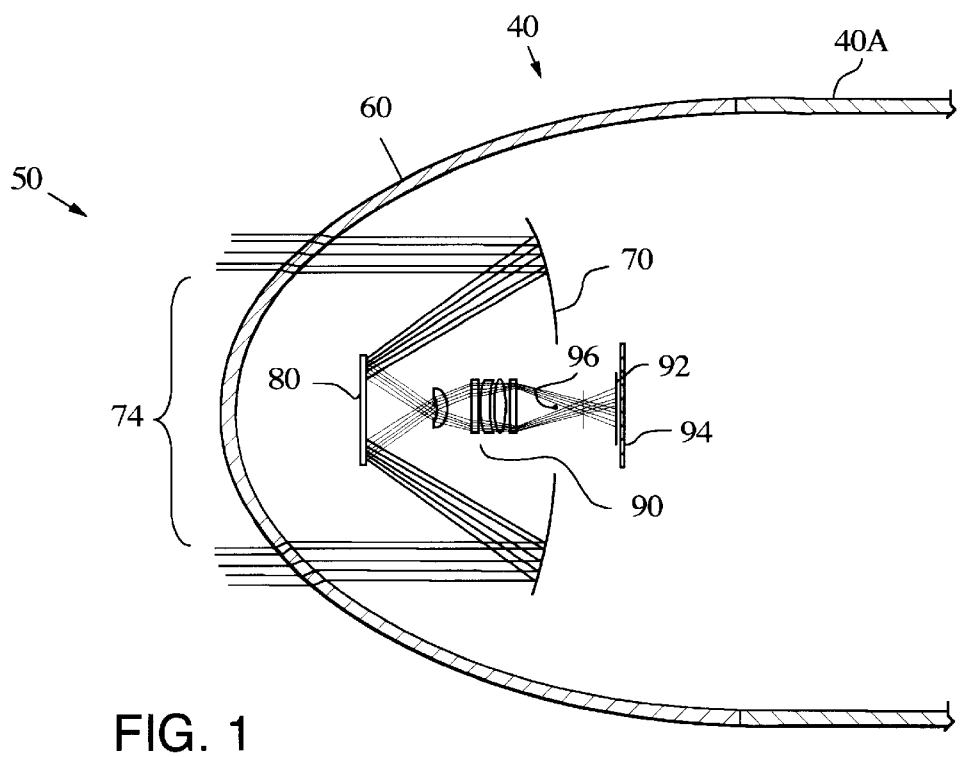
FIG. 1
FIG. 2
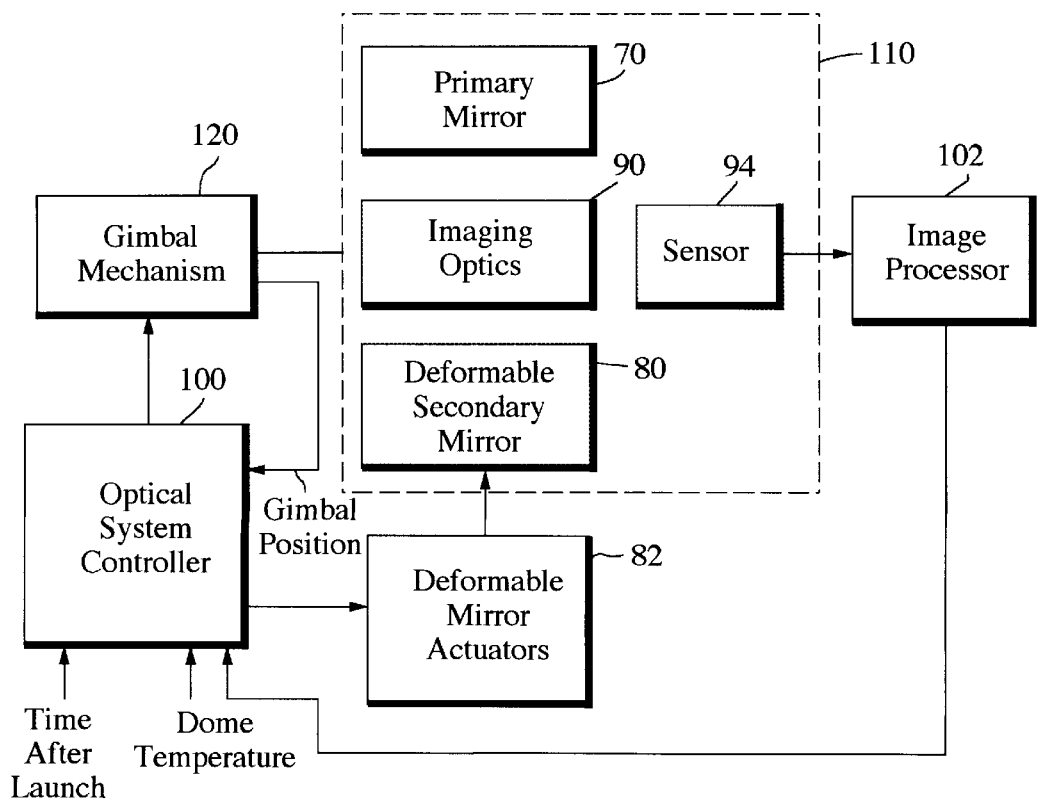

SENSOR SYSTEM WITH DYNAMIC OPTICAL CORRECTOR

TECHNICAL FIELD OF THE INVENTION

This application claims priority from Provisional Application No. 60/060,872, filed Oct. 2, 1997.

The present invention relates to optical correction systems for compensating optical aberrations, and more particularly to a programmable optical system that dynamically corrects or induces aberrations into the optical path of an apparatus such as a missile seeker.

BACKGROUND OF THE INVENTION

Conventional optical sensors utilize spherical domes and flat windows in order to protect optical systems from environmental effects such as rain, humidity, etc. As used herein, the term "conformal" optics describe optical systems that are designed with the operational environment as the primary consideration and the optical imaging properties as a secondary concern. As a result, conformal domes and windows for missile and airborne fire control systems are driven by aerodynamic performance issues, e.g. decreased aerodynamic drag, increased missile velocity and extended operational range, and result in highly aspheric dome geometries that are more elongated in shape.

A major disadvantage of these highly aspheric surfaces is the large aberrations they produce in the transmitted optical wave front. In addition, the inherent asymmetry of conformal surfaces leads to variations in the aberration content presented to the optical sensor as it is gimballed across the field of regard. These two factors degrade the sensor's ability to properly image targets of interest and hence undermine the overall system performance. Consequently, the aerodynamic advantages of conformal domes and windows cannot be realized in practical systems unless dynamic aberration correction techniques are developed to restore adequate optical imaging capabilities.

Flexible mirrors have been used as defocus elements in optical missile seekers, e.g. to defocus the imagery for image normalization purposes. Deformable mirrors have been used as adaptive optical elements in astronomical telescopes. U.S. Pat. Ser. No. 4,773,748 describes dynamically controlled deformable mirrors for use in applications such as projection systems.

SUMMARY OF THE INVENTION

A dynamic optical corrector is described, which functions to introduce different aberration types and variable amounts of these aberrations into a missile seeker. These variable aberrations are introduced using a deformable mirror or mirrors. The shape of the mirror(s) is (are) altered to give optimal image quality. This will allow the optical system to be used with conformal domes, which induce variable amounts of aberration depending on the gimbal position within the dome. Conformal optical domes have not been used in the past because they introduce large amounts of aberrations that vary across the field of regard. The dynamic corrector could also be used in any other seeker design requiring dynamic correction. This would include dynamic focus requirements.

BRIEF DESCRIPTION OF THE DRAWING

These and other features and advantages of the present invention will become more apparent from the following detailed description of an exemplary embodiment thereof, as illustrated in the accompanying drawings, in which:

FIG. 1 illustrates a missile seeker system in accordance with the invention.

FIG. 2 is a schematic block diagram of elements of the seeker system of FIG. 1.

DETAILED DESCRIPTION OF THE PREFERRED EMBODIMENT

Figure 3:
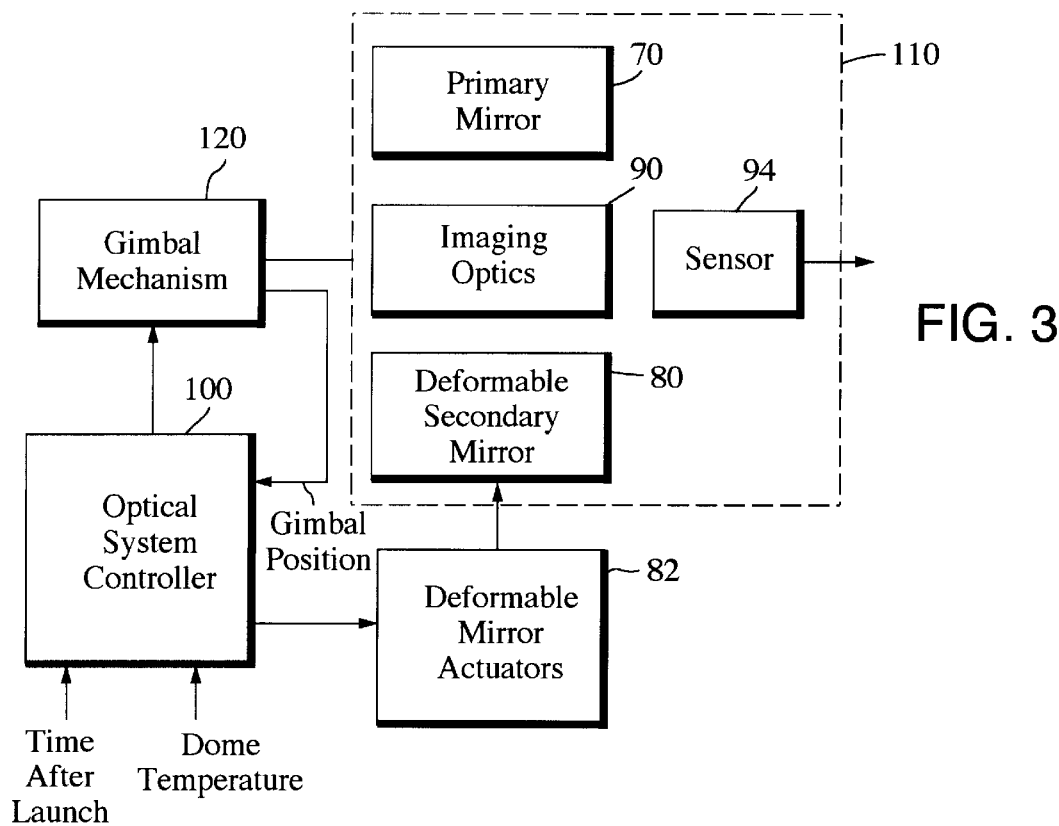
FIG. 3 is a schematic block diagram of the system of FIG. 2 operating in a first, open loop, mode of operation.

A dynamic optical corrector for missile seekers in accordance with this invention combines a low-mass, programmable, deformable mirror with traditional rigid optical elements to dynamically correct or induce aberrations in missile seekers. The desired shape of the deformable mirror is programmed, computed, or measured and the mirror deformed to the desired shape. The appropriate corrective shape can be applied in two modes. In the first mode, the mirror is shaped in response to features derived from the rest of the optical system, based on system information, e.g. gimbal position (pointing angle), temperature of the dome, and time after launch. The particular deformation for a set of operating parameters will typically be computed in advance, and stored as data in an on-board memory to be accessed by an on-board processor. In the second mode, the shape of the mirror is coupled in a feedback loop which responds to information derived in real time from the sensed image.

The mirror deformations may be accomplished by electrostatic forces, magnetic forces, piezoelectric devices, or other means. Deformable mirrors and mirror actuator systems suitable for the purpose are known in the art. See, e.g., "Technology and applications of micromachined silicon adaptive mirrors," Vdovin et al., Opt. Eng. 36(5), May 1997, pages 1382–1390; and "Use of micro-electro-mechanical deformable mirrors to control aberrations in optical systems: theoretical and experimental results," Roggeman et al., Opt. Eng. 36(5), May 1997, pages 1326–1338. Preferably, the mirror has a small diameter mirror surface, and is made of a thin sheet of material. For an exemplary missile seeker application, for example, the mirror diameter could be about 1 cm, with a 1 to 2 micron thickness, and the mirror could be fabricated of silicon with a coating of reflective material such as aluminum or silver.

The placement of the mirror in relation to the other optical elements is dependent upon the design specifications and the resulting optical prescription, with the exact location being optimized with respect to final image quality. The deformable mirror may be placed at the position of the secondary mirror in a two-mirror all reflective or catadioptric telescope design, for example. It is also possible to place the deformable mirror at the position of the primary mirror, or even combine two deformable mirrors on the primary and secondary mirrors.

FIG. 1 illustrates an exemplary embodiment of a missile seeker system employing a dynamic optical corrector in accordance with the invention, mounted in an airborne missile indicated generally as element 40 with a missile body or fuselage 40A, which can be fabricated of metal or other rigid, high-strength material. The seeker system 50 includes a conformal dome 60 fabricated of a material, such as zinc sulfide, sapphire, magnesium fluoride, or BK7, which is transparent to an incident wave front, e.g. in the infrared. The particular spectral band of interest will be dependent on the application, and can range from the ultraviolet to the infrared. The system further includes, in this exemplary embodiment, a primary mirror 70 and a secondary mirror 80 which together form a telescope which directs the image light onto an optical relay system 90. The relay system in turn relays an image from the optical path just behind the telescope to the focal plane 92. In this embodiment, a planar sensor array 94 is disposed at the image plane 92 for producing images, which may be read out and used by a seeker image processor 102. The mirrors 70 and 80 establish a field of view, indicated generally by reference 74 for the system 50. In accordance with the invention, the secondary mirror 80 may be a deformable mirror.

FIG. 2 illustrates in schematic fashion the system 50. The mirrors 70 and 80, the optical system 90, and the sensor 94 comprise a set of gimballed components 110 supported for gimballed movement about a gimbal point 96. A gimbal mechanism 120 includes a positioning mechanism to move these elements in response to positioning commands from a controller 100. This provides the capability of positioning the sensor 94 through a range of fields of view. The whole field of coverage of the field of view as the mirrors and sensor are gimballed through the gimbal range of movement defines the field of regard of the system. An image processor 102 receives image data from the sensor 94, and is part of the seeker system, and its output is used in ways typical in seeker systems. Additionally, the image processor 102 performs the function of providing data indicating the type and strength of optical aberrations, which are used by the controller in a manner described more fully below.

To provide optical compensation for different aberrations introduced by the conformal dome 60 as the sensor is positioned at different positions by the gimbal, or as other operational conditions change, the controller 100 provides correction commands to the correction actuators 82 to deform the mirror 80. The mirror deformations may be accomplished by electrostatic forces, magnetic forces, piezoelectric devices, or other means.

The appropriate corrective shape can be applied in two modes. In the first mode, the mirror is shaped in response to features derived from the rest of the optical system. Some examples of these features are time after launch, dome temperature, and gimbal angle. The first mode of operation is illustrated in a schematic form in FIG. 3. This mode is an open loop operational mode, wherein the controller 100 receives data signals specifying the gimbal position, the dome temperature (from a temperature sensor, not shown) and the time after launch. From these data, the controller determines the mirror deformation corresponding to the set of conditions, and generates the mirror deformation commands to control the mirror actuators to deform the mirror. The mirror deformation commands for a given set of optical system features can be predetermined, and stored in a lookup table in memory for readout. Alternatively, the controller 100 may be programmed to calculate the necessary deformation commands in real time.

Figure 4:
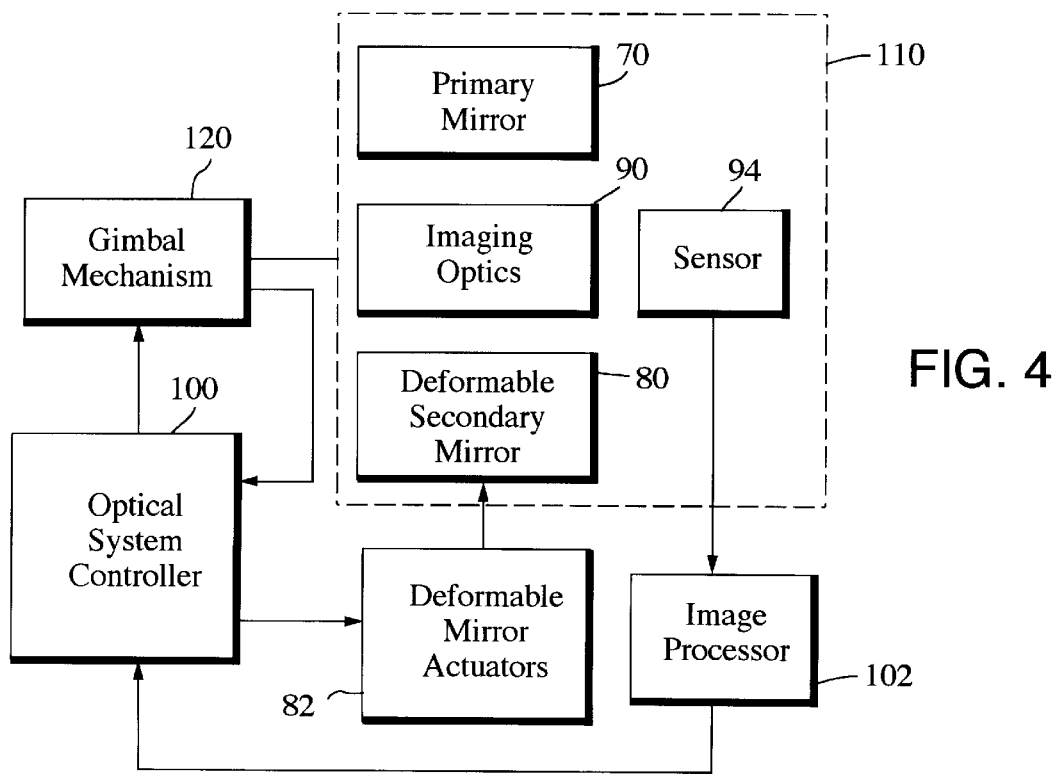
FIG. 4 is a schematic block diagram of the system of FIG. 2 operating in a second, feedback loop, mode of operation.

In the second mode, the shape of the mirror is coupled in a feedback loop which responds to image information derived computationally from the sensor 94. This mode is illustrated in the schematic block diagram of FIG. 4, wherein the image processor 102 responds to the sensor data, and performs the additional function of determining the type and size of optical aberrations in the image. The image processor 102 communicates to the controller 100 data indicating these optical aberrations. The controller then interprets these data to generate the mirror deformation commands to control the mirror actuators 82 to compensate the optical aberrations determined by the image processor.

One method of using image information to derive control signals for the deformable mirror is called "phase diversity." This method is described by Paxman, R. G., Schultz, T. J. and Fienup, J. R., in "joint Estimation of Object and Aberrations by using Phase Diversity," J. Opt. Soc. Am. A9, no. 7, pp. 1072–1085, 1992. The method uses in- and out-of-focus images to estimate the object that produced the images and the aberrations which degraded the images. The in- and out-of-focus images would be obtained by commanding the deformable mirror to assume two different focus positions during alternate image collection times.

Applications of a dynamic optical corrector in accordance with this invention include the use with conformal domes or windows where the shape has been optimized with regard to criteria, aerodynamics for example, other than optical performance. Missile domes have traditionally been spherically shaped in order to optimize image quality. Conformal domes induce variable amounts and types of aberrations across the field of regard, necessitating dynamic aberration correction. The deformable mirror(s) in accordance with the invention permit(s) dynamic aberration correction and allows the use of conformal domes in missile systems.

In the past, the missile seeker has been designed with relatively small tolerances. Parts for the seeker are fabricated in accordance with the small tolerance specification, and are inspected to determine whether the parts are within the small tolerance specifications. If the parts meet the tolerance specification, the seeker parts are assembled and aligned. The seeker is then tested to determine if it meets performance specifications, and if it does not, the seeker is partially disassembled, and parts are replaced and/or re-aligned, and reassembled. The seeker again is tested to determine whether it meets the performance specifications, and if it does not, it must again be partially disassembled and re-aligned. Only after the seeker is found to meet the performance specifications is it integrated with the missile. This process is time consuming, and the parts are more expensive to fabricate due to the small tolerances.

Figure 5:
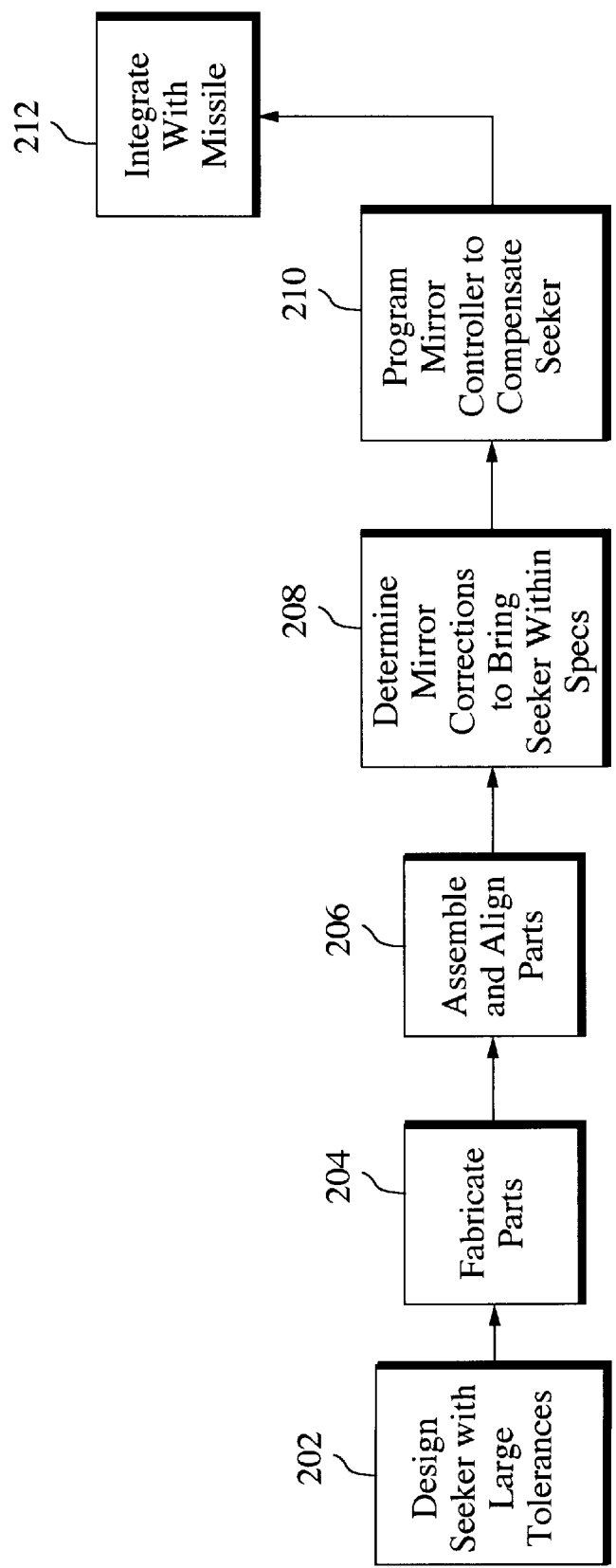
FIG. 5 is a process flow diagram illustrating use of the dynamic optical corrector to compensate for part and assembly tolerances and aberrations in the assembly of a missile seeker.

The dynamic optical corrector in accordance with an aspect of this invention allows the optical prescription to be adjusted to compensate for imperfectly matching parts in production. This would permit optical components, such as domes and windows, to be interchanged without tedious manual refocusing. The optical performance could instead be under software control, resulting in automated test and adjustment. This is illustrated with respect to the process flow diagram of FIG. 5. At step 202, the seeker is designed with relatively larger tolerances than is the case with the known design process. At step 204, the parts are fabricated in accordance with the lower tolerances. At step 206, the parts are assembled and aligned. At step 208, the seeker is tested, and the deformable mirror corrections needed to bring the seeker to within the performance specifications are determined. The deformable mirror controller is then programmed to compensate the seeker for the determined aberrations and ensure that the seeker meets the performance specifications. The seeker is then integrated with the missile. As a result of the use of a dynamic optical corrector in accordance with the invention, the seeker process is less expensive, and can be completed with fewer process steps.

The dynamic optical corrector in accordance with the invention permits conformal domes to be used on an operational basis. Conformal domes will allow optically guided missiles to travel faster and farther on less fuel than is currently possible with missiles that have spherical domes. The dynamic optical corrector decreases the time and expense associated with missile production since the deformable mirror may be used to automate the final adjustment of optical components. It can also be used to defocus the optical system, thereby facilitating focal plane irradiance and responsivity normalization.

While the dynamic optical corrector has been described above in connection with an airborne missile seeker application, the invention in general has utility in gimballed sensor systems with aspheric domes or windows. For example, the shape of the dome may be dictated by radar stealth considerations, instead of aerodynamic considerations. The dome or window could be mounted on other airborne platforms, e.g. with a conformal window in the skin of the platform fuselage or wing. Other applications include the use of a conformal window in combination with a gimballed optical sensor used in an armored vehicle or tank. In these cases, the window is aspheric or non-flat.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A sensor system employing dynamic optical correction for correcting dynamically varying aberrations, comprising:
    an aspheric dome or window structure, fabricated of a material which transmits incident wave front energy in a spectral range;
    a set of gimballed elements disposed within the dome/window structure and including a first optical system for directing energy incident through the dome structure within a field of regard toward an image plane, said first optical system including a deformable mirror, and a sensor array disposed at said image plane;
    a gimbal mechanism for gimballing the first optical system and the optical correction system through a range of movement in response to gimbal position commands;
    a dynamic actuator for deforming said deformable mirror in response to mirror deformation commands; and
    a controller adapted to generate said gimbal position commands for controlling the gimbal mechanism to position the set of gimballed elements at positions within the range of movement, said controller further adapted to provide said mirror deformation commands for controlling the dynamic actuator to provide dynamic optical correction of optical aberrations introduced by the dome/window structure as the optical apparatus is gimballed through the field of regard.

2. The system of claim 1 wherein said first optical system includes a primary mirror and a secondary mirror.

3. The system of claim 2 wherein said secondary mirror is said deformable mirror.

4. The system of claim 1 wherein said controller is adapted to operate in a first mode, wherein the controller generates mirror deformation commands to shape the deformable mirror in response to a set of operational parameters including dome temperature and gimbal pointing angle.

5. The system of claim 1 further comprising an image processor for processing image data provided by the sensor array and determining corrections to be made, and wherein said controller is adapted to operate in a feedback loop mode adapted to generate mirror deformation commands to shape of the mirror in dependence on correction signals from the image processor.

6. The system of claim 1 wherein said set of gimballed elements further includes an optical relay system for relaying said incident wave front energy onto said image plane.

7. An airborne missile seeker system employing dynamic optical correction for correcting dynamically varying aberrations, comprising:
    an aspheric dome or window structure, fabricated of a material which transmits incident wave front energy in a spectral range;
    a set of gimballed elements disposed within the dome/window structure and including a first optical system for directing energy incident through the dome structure within a field of regard toward an image plane, said first optical system including a deformable mirror, and a seeker sensor array disposed at said image plane;
    a gimbal mechanism for gimballing the first optical system and the optical correction system through a range of movement in response to gimbal position commands;
    a dynamic actuator for deforming said deformable mirror in response to mirror deformation commands; and
    a controller adapted to generate said gimbal position commands for controlling the gimbal mechanism to position the set of gimballed elements at positions within the range of movement, said controller further adapted to provide said mirror deformation commands for controlling the dynamic actuator to provide dynamic optical correction of optical aberrations introduced by the dome/window structure as the optical apparatus is gimballed through the field of regard.

8. The system of claim 7 wherein said first optical system includes a primary mirror and a secondary mirror.

9. The system of claim 8 wherein said secondary mirror is said deformable mirror.

10. The system of claim 7 wherein said controller is adapted to operate in a first mode, wherein the controller generates mirror deformation commands to shape the deformable mirror in response to a set of operational parameters including time from missile launch, dome temperature and gimbal pointing angle.

11. The system of claim 7 further comprising an image processor for processing image data provided by the sensor array and determining corrections to be made, and wherein said controller is adapted to operate in a feedback loop mode adapted to generate mirror deformation commands to shape of the mirror in dependence on correction signals from the image processor.

12. The system of claim 7 wherein said set of gimballed elements further includes an optical relay system for relaying said incident wave front energy onto said image plane.

13. A method of assembling a sensor system comprising a set of gimballed elements including a first optical system for directing energy incident within a field of regard toward an image plane, said first optical system including a deformable mirror, and a sensor array disposed at said image plane, the sensor system further including a mirror controller and a set of mirror actuators to deform the mirror in accordance with deformation commands generated by the mirror controller, the method comprising a sequence of the following steps:
    providing the gimballed elements;

assembling the set of gimballed elements and performing an alignment of the gimballed elements;

performance testing the assembled set of gimballed elements to determine deviations from a set of predetermined performance specifications, and determining a set of mirror corrections needed to bring the assembled set of gimballed elements within said predetermined set of performance specifications;

programming the controller with the mirror corrections to compensate the seeker during seeker operation.

14. The method of claim 13 wherein the step of providing the set of gimballed elements includes fabricating the gimballed elements in accordance with relatively large dimensional tolerances.

* * * * *